US009831926B2

(12) United States Patent
Burström et al.

(10) Patent No.: US 9,831,926 B2
(45) Date of Patent: *Nov. 28, 2017

(54) METHOD AND APPARATUS FOR PERFORMING COORDINATED MULTIPOINT TRANSMISSION AND RECEPTION (COMP) IN A WIRELESS COMMUNICATION NETWORK

(71) Applicant: Telefonaktiebolaget L M Ericsson (publ), Stockholm (SE)

(72) Inventors: Per Burström, Luleå (SE); Peter De Bruin, Gammelstad (SE); Bo Hagerman, Tyresö (SE); Arne Simonsson, Gammelstad (SE); Per Skillermark, Årsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/043,014

(22) Filed: Feb. 12, 2016

(65) Prior Publication Data
US 2016/0164579 A1    Jun. 9, 2016

Related U.S. Application Data

(63) Continuation of application No. 14/006,489, filed as application No. PCT/EP2011/054288 on Mar. 22, 2011, now Pat. No. 9,281,876.

(51) Int. Cl.
*H04W 4/00* (2009.01)
*H04B 7/024* (2017.01)
(Continued)

(52) U.S. Cl.
CPC ........... *H04B 7/024* (2013.01); *H04L 5/0035* (2013.01); *H04W 72/121* (2013.01);
(Continued)

(58) Field of Classification Search
CPC .... H04B 7/024; H04B 7/0452; H04B 7/0639; H04B 7/0632; H04B 7/0634;
(Continued)

(56) References Cited

U.S. PATENT DOCUMENTS

| 2008/0037689 A1* | 2/2008 | Kurt | H03G 3/3089 375/340 |
| 2011/0034163 A1* | 2/2011 | Zhu | H04B 7/022 455/422.1 |
| 2011/0124345 A1* | 5/2011 | Lee | H04W 72/1231 455/452.2 |

FOREIGN PATENT DOCUMENTS

| WO | 2006045699 A1 | 5/2006 |
| WO | 2010034571 A1 | 4/2010 |

(Continued)

OTHER PUBLICATIONS

Unknown, Author, "Investigation on Quantization Scheme of Explicit Spatial Channel Feedback for CoMP Joint Transmission in LTE-Advanced", 3rd Generation Partnership Project, "Investigation on Quantization Scheme of Explicit Spatial Channel Feedback for CoMP Joint Transmission in LTE-Advanced," 3GPP TSG RAN WG1 Meeting #58bis, R1-094244, Oct. 12-16, 2009, Miyazaki, Japan.

(Continued)

*Primary Examiner* — Golam Sorowar
(74) *Attorney, Agent, or Firm* — Murphy, Bilak & Homiller, PLLC (57) ABSTRACT

A network node carries out operations for use in coordinating data transmissions to user equipments in a wireless communication network and, in at least one embodiment, the network node obtains signal strength values indicating antenna relationships between respective user equipments and respective antennas among two or more antennas involving at least two access nodes in the network. The (Continued)

network node arranges the user equipments into groups, based on the antenna relationships, and, based on the antenna relationships, associates each group of user equipments with a sub-set of the two or more antennas. Still further, the network node coordinates data transmissions performed by the at least two access nodes to each group of user equipments, using the associated sub-set of the two one or more antennas.

6 Claims, 6 Drawing Sheets (51) Int. Cl.
*H04W 72/12* (2009.01)
*H04L 5/00* (2006.01)
*H04W 8/18* (2009.01)
*H04W 16/24* (2009.01)
*H04W 24/00* (2009.01)

(52) U.S. Cl.
CPC ............ *H04W 8/186* (2013.01); *H04W 16/24* (2013.01); *H04W 24/00* (2013.01)

(58) Field of Classification Search
CPC ... H04L 5/0035; H04L 1/0026; H04L 12/189; H04L 2025/03426; H04L 25/0202; H04W 24/10; H04W 72/082; H04W 72/042; H04W 72/1268; H04W 4/08; H04W 52/34; H04W 72/0453
See application file for complete search history.

(56) References Cited

FOREIGN PATENT DOCUMENTS

WO          2010036158 A1    4/2010
WO    WO 2010036158 A1 *   4/2010 ............ H04W 72/08

OTHER PUBLICATIONS

Unknown, Author, "SCF-based COMP: Iterative Scheduler Algorithm and Performance Gain over Single-Point SU/MU Beamforming", 3rd Generation Partnership Project, "SCF-based COMP: Iterative Scheduler Algorithm and Performance Gain over Single-Point SU/MU Beamforming," 3GPP TSG RAN1#58 bis, R1-093963, Oct. 12-16, 2009, Miyazaki, Japan. Oct. 12, 2009.

Unknown, Author, "Views of Schemes for CoMP", 3rd Generation Partnership Project, "Views of Schemes for CoMP," 3GPP TSG-RAN WG1 #63bis, R1-110180, Jan. 17-21, 2011, Dublin.

* cited by examiner

METHOD AND APPARATUS FOR PERFORMING COORDINATED MULTIPOINT TRANSMISSION AND RECEPTION (COMP) IN A WIRELESS COMMUNICATION NETWORK

RELATED APPLICATIONS

This application is a continuation of co-pending U.S. patent application Ser. No. 14/006,489, filed 20 Sep. 2013, which is a national stage entry under 35 U.S.C. §371 of international patent application serial no. PCT/EP2011/054288, filed 22 Mar. 2011. The entire contents of each of the aforementioned applications is incorporated herein by reference.

TECHNICAL FIELD

The present invention relates to the field of coordinated multipoint transmission and reception (CoMP) in wireless communication networks, in particular to a method, an apparatus, and a network node for use in performing coordinated data transmissions in a wireless communication network.

BACKGROUND

Cell grouping is a well-known technique for improving and managing interference in cellular wireless communication networks. Already for 2G wireless communication network planning (on rather long time horizon, days typically), inter-cell interference measurements are performed to group cells together, in order to minimize radio interference and make cell and/or frequency planning more efficient.

For future wireless communication networks, an important method to increase both coverage and capacity is to use cell cooperation for signal transmission and reception between nodes in the network and user equipments located in the cooperating cells. This is generally referred to as coordinated multipoint transmission and reception (CoMP). This cooperation can be used in downlink communication for scheduling and data transmission using, for example, beam forming or joint coherent processing and transmissions, or in uplink communication, where a multitude of antennas are used to suppress and cancel interference and increase the signal-to-noise (SNR) ratio. It has been suggested to introduce CoMP in the 3GPP Long Term Evolution (LTE/SAE) wireless communication system, but it should also be noted that CoMP is also applicable for other wireless communication systems, such as, for example, WiMax.

Although it is desired to build large CoMP cells of cooperating cells in order to minimize cell border effects that results in a worse user bit rate, cells in the network must be sub-divided into groups of cooperating cells in order to keep computation complexity at reasonable levels. However, the sub-division or formation of these groups of cooperating cells, that is, CoMP cells, can pose a very difficult task.

Besides being able to be based on a numerous different physical properties, such as for example, geographical proximity, radio wave propagation environment, traffic distributions and/or using neighboring-cell relations, including mobility information, such as handover statistics, the formation of a CoMP cell of cooperating cells also implies an increased level of hardware processing and backhaul capacity as compared to conventionally deployed non-cooperative wireless communication networks. The reasons for this increase include, for example, more complex deployment scenarios with differently sized cells, sub-cells, etc., as well as the increased higher grade of coordination between the cells on a shorter time scale.

Due to this inherent trade-off between an increased number of cells included in a CoMP cell of cooperating cells and increased complexity, a problem that may be experienced in forming CoMP cells of cooperating cells is that the CoMP cells of cooperating cells do not show the capacity or coverage performance as expected from their cooperating cell size.

SUMMARY

It is an object to obviate at least some of the above disadvantages and achieve a method at provides improved CoMP cells of cooperating cells.

Accordingly, a method for use in a network node for coordinating data transmissions to user equipments in a wireless communication network is provided, wherein the wireless communication network comprises at least two access nodes each having one or more antennas and being arranged to perform coordinated data transmissions to the user equipments. The method comprises: obtaining signal strength values associated with the one or more antennas of the at least two access nodes for a number of user equipments; arranging the number of user equipments into one or more groups of user equipments and associating each of the one or more groups of user equipments with a sub-set of the one or more antennas of the at least two access nodes based on the obtained signal strength values; and coordinating data transmissions performed by the at least two access nodes to each of the one or more groups of user equipments based on the sub-set of the one or more antennas of the at least two access nodes associated with each group of user equipments, respectively.

One advantage of the method is that it enables the identification of one or more individual antennas of the at least two access nodes that has the most impact on a specific sub-group of user equipments in a CoMP cell of cooperating cells. By grouping the user equipments in the CoMP cell in accordance with sub-groups of user equipments based on the identified individual antennas and coordinating data transmissions performed by the at least two access nodes in accordance with these groups of user equipments, an antenna-specific scheduling of the coordinated data transmissions to the user equipments is enabled. This antenna-specific scheduling provides a higher degree of granularity and discrimination than what can be achieved in a conventional case wherein all of the antennas of the at least two access nodes may be forced to contribute to the transmission to a specific user equipment even though some individual antennas may have a connection to the specific user equipment which has very poor signal strength. Thus, it provides for a smaller and more efficient amount of antennas to be used in the coordinated data transmissions, whereby an increased capacity and/or coverage performance of CoMP cells of cooperating cells is provided which improve the CoMP cells of cooperating cells.

The method further provides the advantage of improving the utilization of coordinated data transmissions to user equipments by allowing the building of larger CoMP cells of cooperating cells, which minimize cell border effects causing worse user bit rates, as well as reducing feedback and scheduling complexity.

Arranging the number of user equipments and associating the one or more groups of user equipments may further comprise: calculating antenna relationship values for each of the number of user equipments based on the obtained signal strength values, and arranging the number of user equipments into one or more groups of user equipments and associating each of the one or more groups of user equipments with a sub-set of the one or more antennas of the at least two access nodes based on the calculated antenna relationship values. This advantageously provides antenna relationship values for each of the user equipments which are indicative of the internal relationship between the obtained signal strength values, and allows an estimate of the relative importance of the individual antennas associated with the signal strength values to the connection towards the user equipment to be achieved and utilized. According to one example, the antenna relationship values could indicate how the highest obtained signal strength value relates to each of the other obtained signal strength values.

Also, arranging the number of user equipments and associating the one or more groups of user equipments based on the calculated antenna signal relationship values may further comprise: comparing one or more of the calculated antenna relationship values of each of the number of user equipments, and arranging the number of user equipments into one or more groups of user equipments and associating each of the one or more groups of user equipments with a sub-set of the one or more antennas of the at least two access nodes based on the antenna relationship value comparison. This advantageously utilizes the antenna relationship values in order to identify important individual antennas for sub-groups of user equipments based on which the grouping of user equipments is performed.

Furthermore, a first group of user equipments may be combined with a second group of user equipments to form a combined third group of user equipments based on jointly associated antennas in the sub-sets of the one or more antennas of the access nodes associated with the first and second group of user equipments, respectively. This advantageously enables an automatic procedure for expanding the group of user equipments into a larger group of user equipments whenever it is possible and preferred.

The method may also comprise dividing a first group of user equipments into a second and third group of user equipments based on jointly associated antennas in the sub-sets of the one or more antennas of the access nodes associated with the second and third group of equipments, respectively. In a similar manner as presented above, this advantageously enables an automatic procedure for decreasing the group of user equipments into a smaller group of user equipments whenever it is possible and preferred.

Also, the combination of groups of user equipments may be stopped or the division of a group of user equipments may be initiated based on one or more of: when one or more predetermined threshold number of antennas is comprised in the sub-set of the one or more antennas of the at least two access nodes associated with the group of user equipments, when one or more predetermined threshold number of user equipments have been associated with the group of user equipments, when one or more predetermined CoMP transmission multi-user limits has been reached for the group of user equipments, when one or more predetermined channel limitations is reached for the group of user equipments, when one or more predetermined transmission power limits are reached, when one or more predetermined backhaul load thresholds are reached, or when one or more predetermined uplink radio channel load thresholds are reached. This advantageously provides suitable limitations to the automatic procedure for expanding the group of user equipments into a larger group of user equipments or dividing a group of user equipments into smaller groups of user equipments, which otherwise may result in too large or too small groups of user equipments reducing the gains of the groups of user equipments and/or in approaching some inherent hardware or signalling limitation.

Coordinating data transmissions performed by the at least two access nodes to each of the one or groups of user equipments may further comprise: scheduling each group of user equipments for downlink transmission separately from each other in frequency and/or time, or on orthogonal resource blocks; and scheduling each user equipment within a group of user equipments for downlink transmission together in frequency and/or time, or on non-orthogonal resource blocks. This advantageously increases the exploitation of the spatial domain diversity gains and limits the scheduling and receiver complexity. It should also be noted that these features may be particularly advantageous when implemented in a 3GPP Long Term Evolution (LTE) wireless communication system in which user equipments are configured to report antenna phase information. This antenna phase information may then be used when coordinating data transmissions to the groups of user equipments.

Also, the method may further comprise: obtaining channel information for a group of user equipments to the sub-set of the one or more antennas of the access nodes associated with the group of user equipments; and coordinating data transmissions to the group of user equipments based on the obtained channel information. This advantageously enables the collection of detailed channel information at limited costs form of overhead.

Obtaining signal strength values associated with the one or more antennas of the at least two access nodes for a number of user equipments may comprises receiving signal strength values measured at the access nodes from the access nodes, or receiving signal strength values measured at the user equipments from the user equipments via the access nodes. This advantageously provides two different alternatives for obtaining the signal strength values.

The method described above may be performed repetitively with a periodicity based on capturing slow fading. This advantageously provides for a flexible procedure being performed on a relatively short time scale, such as, for example, once every second, increasing the gain from the scheduling coordination in frequency and time as previously mentioned.

An apparatus for use in a network node for coordinating data transmissions to user equipments in a wireless communication network is also provided, wherein the wireless communication network comprises at least two access nodes each having one or more antennas and being arranged to perform coordinated data transmissions to the user equipments. The apparatus comprises: a retrieving unit configured to obtain signal strength values associated with the one or more antennas of the at least two access nodes for a number of user equipments, a cooperating cell group unit configured to arrange the number of user equipments into one or more groups of user equipments and associate each of the one or more groups of user equipments with a sub-set of the one or more antennas of the at least two access nodes based on the signal strength values obtained by the retrieving unit, and a cooperation scheduling unit configured to coordinate data transmission performed by the at least two access nodes to each of the one or more groups of user equipments based on the sub-set of the one or more antennas of the at least two access nodes associated with each group of user equipments, respectively, by the cooperating cell group unit.

In addition, a network node for use in a wireless communication network comprising an apparatus as described above is provided.

BRIEF DESCRIPTION OF THE DRAWINGS

The above and other features and advantages of the present invention will become readily apparent to those skilled in the art by the following detailed description of exemplary embodiments thereof with reference to the accompanying drawings, wherein.

DETAILED DESCRIPTION

The figures are schematic and simplified for clarity, and they merely show details which are essential to the understanding of the invention, while other details have been left out. Throughout, the same reference numerals are used for identical or corresponding parts or steps. It may also be noted that the expression "user equipment" (UE) includes, but is not limited to, a mobile terminal, a mobile phone, a personal digital assistant, a mobile station, a portable computer equipped with suitable transceivers, a stationary computer equipped with suitable transceivers and the like.

The figures are schematic and simplified for clarity, and they merely show details which are essential to the understanding of the invention, while other details have been left out. Throughout, the same reference numerals are used for identical or corresponding parts or steps. It may also be noted that the expression "user equipment" (UE) includes, but is not limited to, a mobile terminal, a mobile phone, a personal digital assistant, a mobile station, a portable computer equipped with suitable transceivers, a stationary computer equipped with suitable transceivers and the like.

Figure 1:
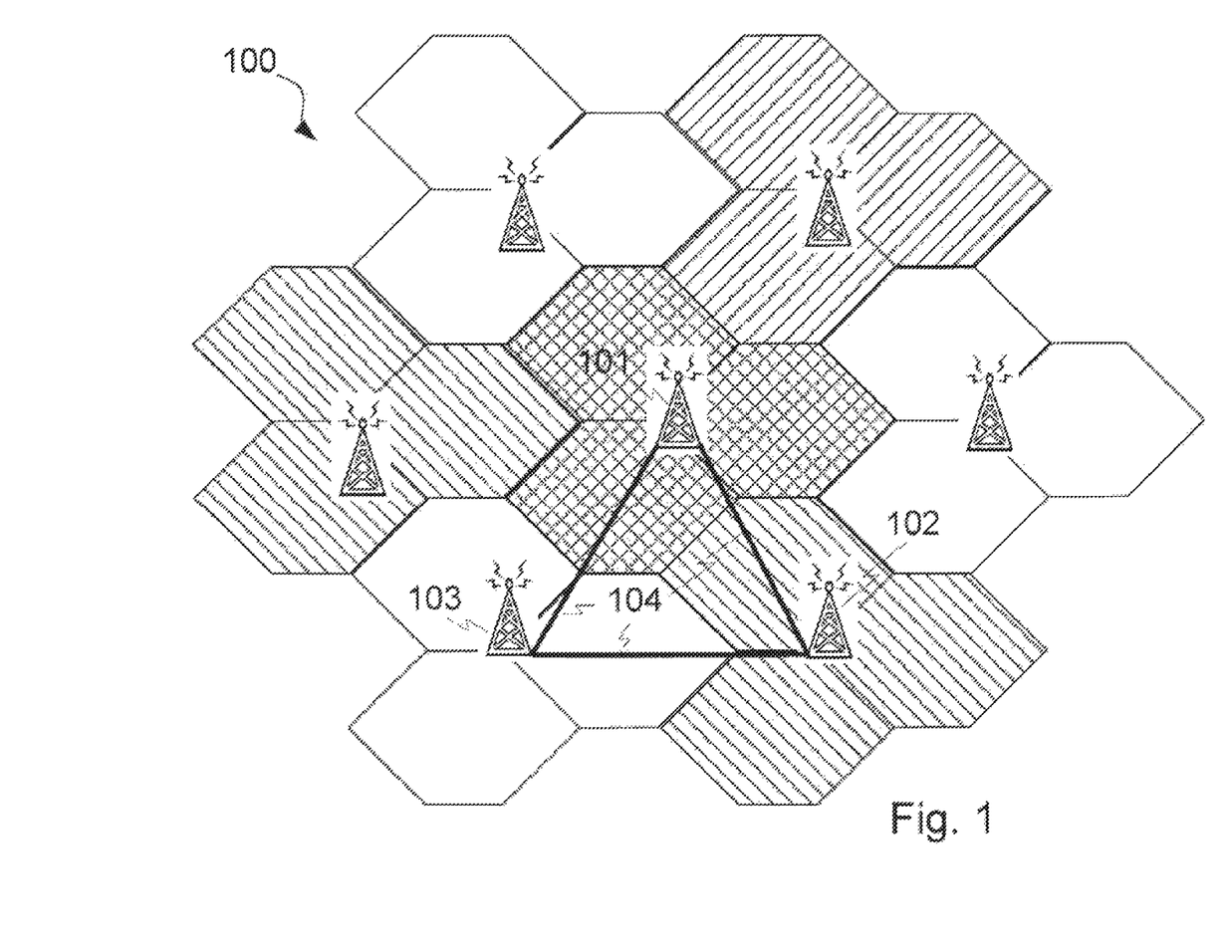
FIG. 1 illustrates an example of a wireless communication system comprising a number of access nodes and cells associated thereto, FIG. 2 schematically illustrates an example of user equipments located in the cells of three access nodes in FIG. 1 configured to perform coordinated data transmissions.

In FIG. 1, an example of a wireless communication system 100 comprising a plurality of access nodes 101, 102, 103 is illustrated. The wireless communication system 100 may be, for example, a 3GPP Long Term Evolution (LTE/SAE) wireless communication system or any wireless communication system suitable for providing downlink coordinated multipoint (CoMP) data transmissions to user equipments. The access nodes 101, 102, 103 may be access nodes, such as, for example, an eNodeB in a 3GPP Long Term Evolution (LTE/SAE) wireless communication system. The access nodes 101, 102, 103 may be connected and configured to communicate with each other over, for example, an X2 connection 104. The access nodes 101, 102, 103 comprise one or more antennas per cell for wireless radio communication with user equipments located within their covering range.

Figure 2:
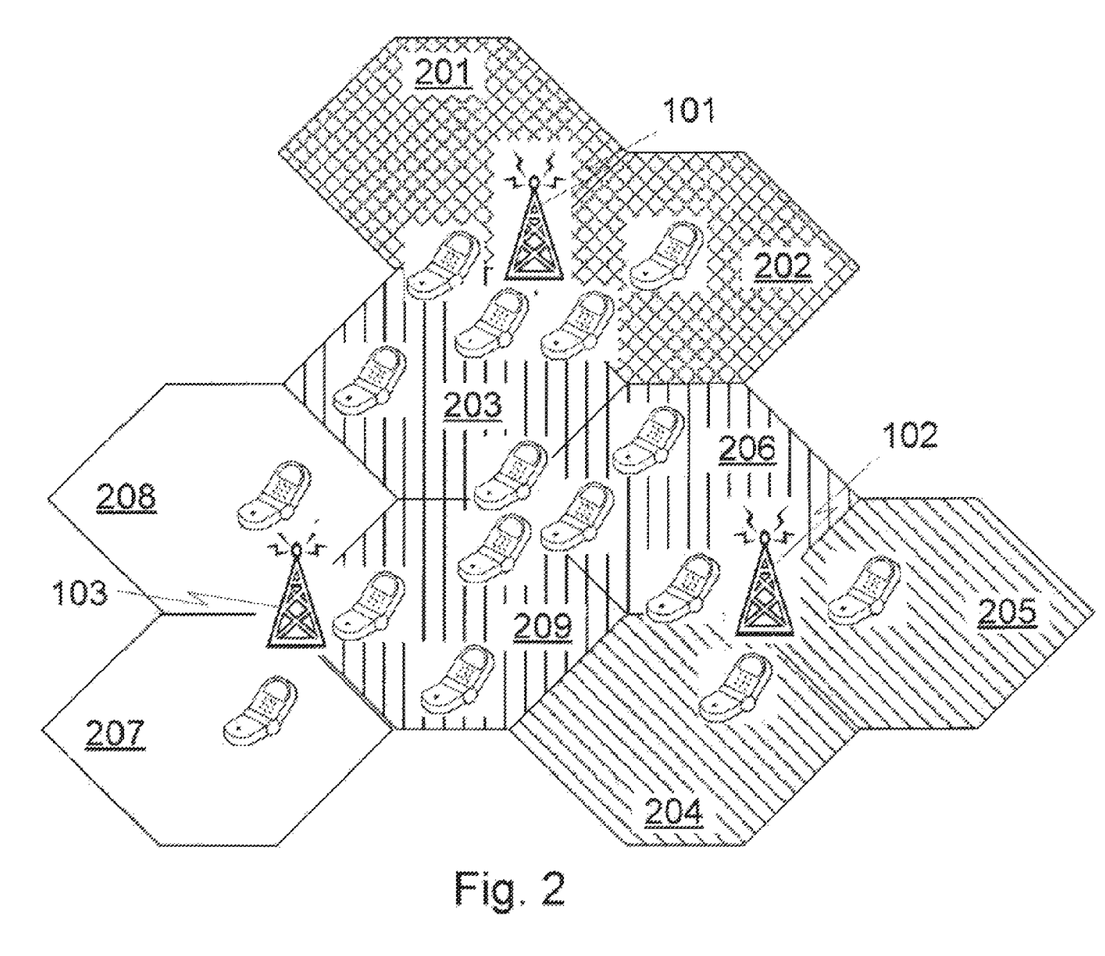

FIG. 2 schematically illustrates an example of user equipments located in the cells 201, 202, 203, 204, 205, 206, 207, 208, 209 of the access nodes 101, 102, 103. The access node 101 may be configured to provide wireless radio coverage to user equipments in cells 201, 202, 203. The access node 102 may be configured to provide wireless radio coverage to user equipments in cells 204, 205, 206. The access node 103 may be configured to provide wireless radio coverage to user equipments in cells 207, 208, 209.

In FIG. 2, the neighboring cells 203, 206, 209 are comprised in a CoMP cell of cooperating cells of the access nodes 101, 102, 103, that is, a CoMP cell of cooperating cells is formed by the cell 203 of the access node 101, the cell 206 of the access node 102, and the cell 209 of the access node 103 (marked with vertical lines in FIG. 2). This means that, within these neighboring cells 203, 206, 209, the access nodes 101, 102, 103 are configured to perform coordinated data transmissions, i.e. able to combine signals of multiple antennas to form a joint coordinated transmission of data, to the user equipments located therein.

It has been recognised, for example, that within large CoMP cells of cooperating cells, during a coordinated data transmission, there may be individual antennas of the access nodes 101, 102, 103 that have very low signal strength for their respective connection to particular user equipments located within the CoMP cell of cooperating cells, but are still used as contributors in the coordinated data transmission to these particular user equipments. An illustrative example is shown in FIG. 2, wherein this may be the case for one or more of the antennas of the access node 101 for a coordinated data transmission to one or more user equipments in cell 209, and/or for one or more of the antennas of the access node 102 for a coordinated data transmission to one or more user equipments in cell 203, and/or for one or more of the antennas of the access node 103 for a coordinated data transmission to one or more user equipments in cell 206. However, it should be noted that although the distance to an access node is used herein for illustrative purposes as indicative of the signal strength, it is commonly known that many different factors may influence the actual signal strength to an access node for a user equipment, such as, for example, network topology, topography of the surrounding environment, buildings, etc.

However, in these illustrative examples, the individual antennas of the access nodes 101, 102, 103 may thus be wasting their resources on connections with very low signal strength in which their contribution is limited, rather than being used for other connections where they may provide a more efficient contribution. This leads to a poor utilization of coordinated data transmissions to user equipments in large CoMP cells of cooperating cells, and in that these large CoMP cells of cooperating cells do not show the capacity or coverage performance as expected from their cooperating cell size. These issues are addressed by the embodiments described in more detail below with reference to FIGS. 3-7.

Figure 3:
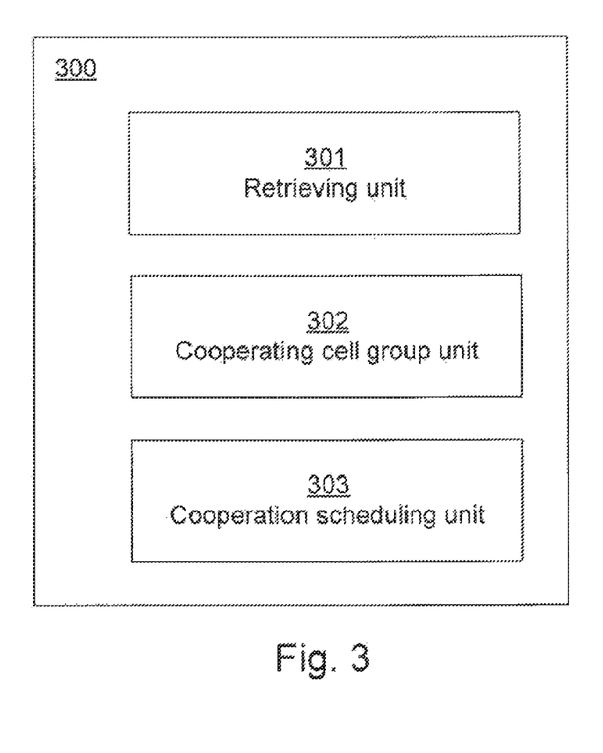
FIG. 3 illustrates an apparatus according to an embodiment of the invention, FIGS. 4-5 schematically illustrates how coordinated data transmissions may be coordinated by the apparatus in FIG. 3.

FIG. 3 illustrates an apparatus 300 for coordinating data transmissions to user equipments in a wireless communication network 100 according to an embodiment of the invention. The apparatus 300 may, for example, be comprised in one of the access node 101, 102, 103. The apparatus 300 is configured to coordinate data transmissions to user equipments performed by the access nodes 101, 102, 103 in the CoMP cell of cooperating cells 203, 206, 209 shown in FIG. 2. The apparatus 300 may comprise a retrieving unit 301, a cooperating cell group unit 302 and a cooperation scheduling unit 303.

The retrieving unit 301 is configured to obtain a number of signal strength values that are associated with the one or more antennas of the access nodes 101, 102, 103 for each of a number of user equipments. Signal strength may also be referred to as path gain or path loss when compensating for transmission power. At the access node 101, 102, 103, each signal received at an antenna port of the one or more antennas of the access nodes 101, 102, 103 from a user equipment may be measured. A signal strength value indicative of the measured signal strength may then be sent from the access nodes 101, 102, 103 to the retrieving unit 301. Optionally, the retrieving unit 301 may be configured to retrieve the signal strength value from the access nodes 101, 102, 103. Hence, signal strength values associated with the one or more antennas of the access nodes 101, 102, 103 may be obtained for each of a number of user equipments by using uplink transmissions from user equipments. In an LTE wireless communication system, for example, power control is commonly used on uplink transmissions from the user equipments. In such cases, it may be advantageous to use path gain or path loss measurements which take the transmission power of uplink transmissions from the user equipments into account.

In some embodiments, the retrieving unit 301 may be configured to obtain the number of signal strength values that are associated with the one or more antennas of the access nodes 101, 102, 103 from each of the number of user equipments. In this case, a user equipment which has received a signal from an antenna port of the one or more antennas of the access nodes 101, 102, 103, may measure the signal strength of the received signal from the antenna port at the user equipment. The received signal may be measured, for example, on pilot signals such as the Reference Symbols (RS) that may be used in an LTE wireless communication system. The user equipment may then report a signal strength value indicative of the measured signal strength to the retrieving unit 301 via the one or more of the access nodes 101, 102, 103. Thus, the retrieving unit 301 may receive the signal strength value from the user equipment associated with the antenna port of the one or more antennas of the access nodes 101, 102, 103. Hence, signal strength values associated with the one or more antennas of the access nodes 101, 102, 103 may also be obtained for each of a number of user equipments by using downlink transmissions from user equipments. In some embodiments, the retrieving unit 301 may optionally be configured to also obtain antenna phase information for each received antenna signal from the access nodes 101, 102, 103. This information may be provided by and received from the user equipments. This may, for example, be performed when the apparatus 300 is implemented in a wireless communication system in which user equipments are configured to report any form of antenna phase information for each received antenna signal from the access nodes 101, 102, 103, such as, for example, using pre-coding matrix indicator (PMI) reporting in the user equipments.

The cooperating cell group unit 302 may receive the obtained signal strength values from the retrieving unit 301. Based on the obtained signal strength values, the cooperating cell group unit 302 may arrange the number of user equipments into groups of user equipments, such as, for example, the groups of user equipments 211, 212, 213, 221, 231, 232, 233 shown in FIG. 5. Furthermore, based on the obtained signal strength values, the cooperating cell group unit 302 may also be configured to associate each of the groups of user equipments, such as, for example, the groups of user equipments 211, 212, 213, 221, 231, 232, 233 shown in FIG. 5, with a sub-set of individual antennas of the access nodes 101, 102, 103, as described in more detail in reference to FIG. 4.

Figure 5:
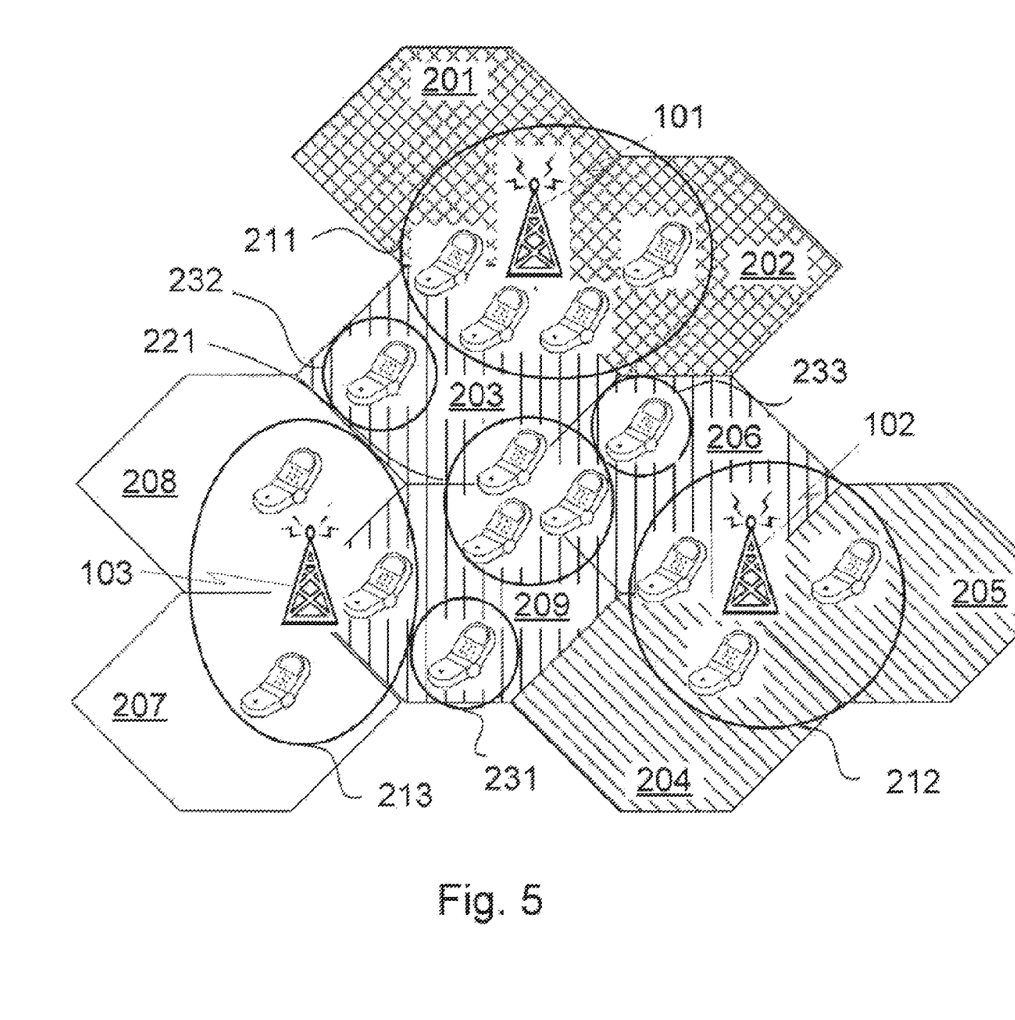

The cooperation scheduling unit 303 may, based on the sub-set of the individual antennas of the access nodes 101, 102, 103 associated with each group of user equipments, respectively, coordinate the data transmission that is performed by the access nodes 101, 102, 103 to each of the groups of user equipments, such as, for example, the groups of user equipments 211, 212, 213, 221, 231, 232, 233 shown in FIG. 5.

In some embodiments of the apparatus 300, the cooperation scheduling unit 304 may further be configured to schedule each group of user equipments 211, 212, 213, 221, 231, 232, 233 for downlink transmission separately from each other in frequency and/or time, or on orthogonal resource blocks when coordinating the data transmission. The cooperation scheduling unit 304 may further be configured to schedule each user equipment within a group of user equipments 211, 212, 213, 221, 231, 232, 233 for downlink transmission together in frequency and/or time, or on non-orthogonal resource blocks. This may, for example, be performed when the apparatus 300 is implemented in a LTE wireless communication system in which user equipments may be configured to report antenna phase information, such as, for example, the CoMP PMI reports previously described. In some embodiments of the apparatus 300, the cooperation scheduling unit 304 may also be configured to obtain channel information for a group of user equipments 211, 212, 213, 221, 231, 232, 233 to the sub-set of the one or more antennas of the access nodes 101, 102, 103 associated with the group of user equipments 211, 212, 213, 221, 231, 232, 233, and coordinate data transmission to the group of user equipments 211, 212, 213, 221, 231, 232, 233 based on the obtained channel information.

It should also be noted that the different groups of user equipments, such as, for example, the groups of user equipments 211, 212, 213, 221, 231, 232, 233 shown in FIG. 5, may comprise partly the same antennas. This is because the joint coordinated data transmissions for each group of user equipments may be performed on different orthogonal resources as described above. This enables overlapping groups of user equipments, i.e. CoMP groups, without experiencing any disadvantageous border effects. Thus, the border of the groups of user equipments shown in FIG. 5 is to be understood merely for illustrative purposes.

It should be noted that one or more of the retrieving unit 301, the cooperating cell group unit 302 and the cooperation scheduling unit 303 may be implemented in one or more processing units (not shown) which may comprise logic for performing the functionality of the apparatus 300. A part, parts or all of the apparatus's 300 functionality may be implemented by means of a software or computer program. The processing unit(s) may also comprise storage means or a memory unit for storing the computer program and processing means, such as, for example, a microprocessor, for executing the computer program. The storage means may also be readable storage medium separated from, but connected to the processing unit. When, in the following, it is described that any one of the retrieving unit 301, the cooperating cell group unit 302 and/or the cooperation scheduling unit 303 performs a certain action or function it is to be understood that a processing unit(s) in the apparatus 300 may use its processing means to execute a certain part of the software or computer program which is stored in its storage means to perform this action or function.

Figure 4:
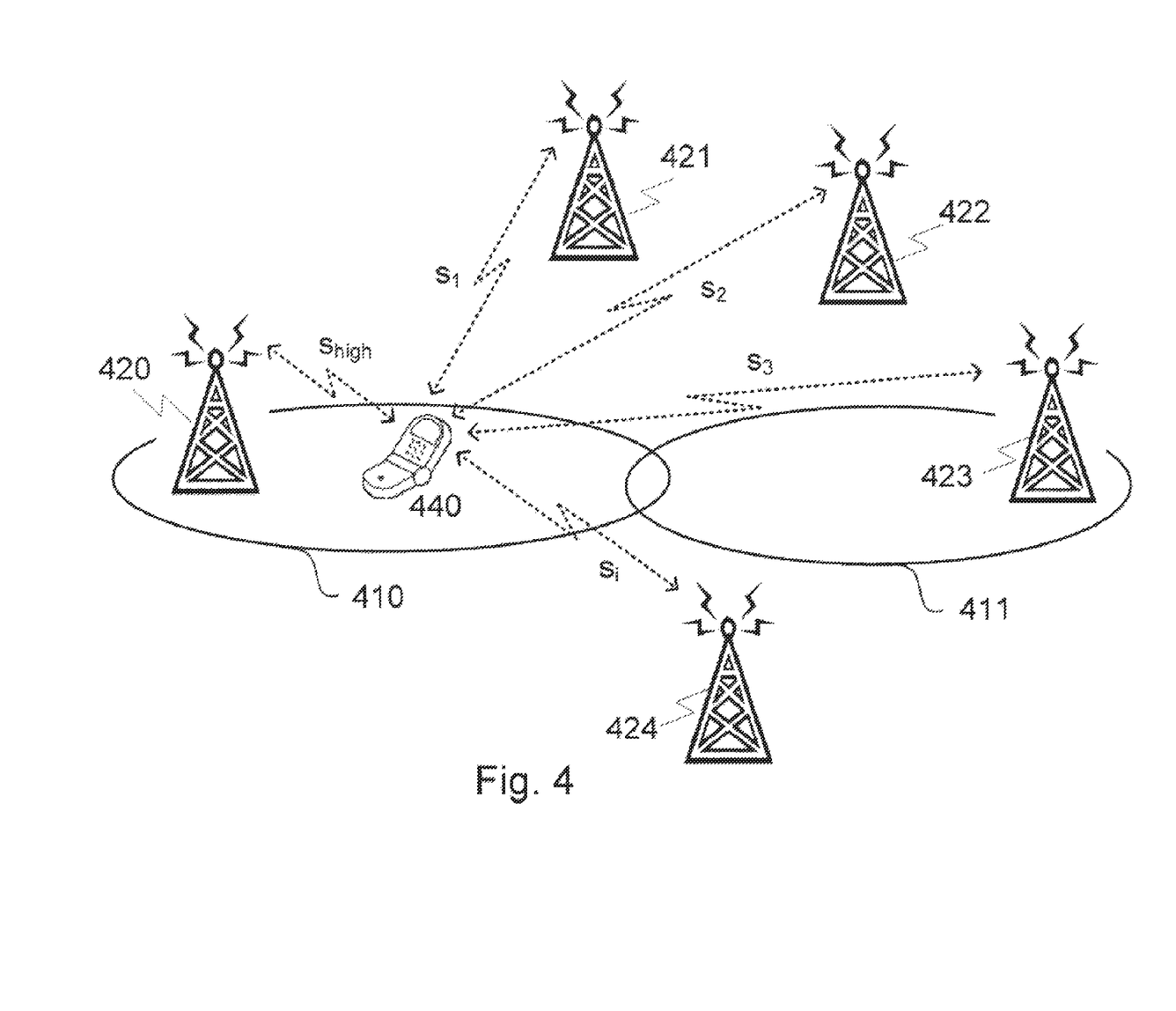

FIGS. 4-5 schematically illustrates an example of how the cooperating cell group unit 302 in the apparatus 300 enables and coordinates the data transmissions in the CoMP cell of cooperating cells of the access nodes 101, 102, 103.

In FIG. 4, a user equipment 440 is comprised in a CoMP cell of cooperating cells of the access nodes 420, 421, 422, 423, 424. Each of the access nodes 420, 421, 422, 423, 424 is configured with a number of antennas. In this case, for illustrative purposes, the number of antennas per access node 420, 421, 422, 423, 424 is limited to one antenna having one antenna port (not shown). However, it is to be understood that any number of antennas having any number of antenna ports may be used in a similar manner. The antenna port at each access node 420, 421, 422, 423, 424 may receive a signal $s_i$ from the user equipment 440 at a moment in time $t_1$. From each antenna port at each access node 420, 421, 422, 423, 424, the retrieving unit 301 may obtain a signal strength value indicative of the measured signal strength of the signal $s_i$ received by each antenna port. In this example, the highest signal strength value may, for example, be obtained for the antenna signal $s_{high}$ at the antenna port of the antenna at the access node 420.

The cooperating cell group unit 302 may then, based on the signal strength values, calculate antenna relationship values. The antenna relationship values may also be referred to as antenna geometry values or antenna-pair-geometry values. The calculation may, for example, be performed by calculating how the highest signal strength value relates to each of the other signal strength values. This may, for example, be performed for each signal strength value $s_i$ indicative of the signal received by each antenna port of each antenna at each access node 420, 421, 422, 423, 424 for the user equipment 440 according to the exemplary formula (1) shown below.

$$S_i = \log_{10}\left\{\frac{10^{s_{high}}}{10^{s_i}}\right\} \text{ [dB]} \qquad (1)$$

The antenna relationship values $S_i$ will also indicate how much each antenna port of each antenna at each access node 420, 421, 422, 423, 424 will contribute to a downlink coordinated data transmission to the user equipment 440 in the CoMP cell of cooperating cells of the access nodes 420, 421, 422, 423, 424.

For example, it may be found that the signal $s_{high}$ at the antenna port of the antenna of the access node 420 and the signal $s_3$ at the antenna port of the antenna at the access node 423 have a significantly larger signal strength towards the user equipment 440 at time $t_1$ than the signals $s_1$, $s_2$ and $s_4$ at the antenna ports of the antennas at the access nodes 421, 422, 424. It may then be assumed that the potential contribution of the antenna ports of the antennas at the access nodes 421, 422, 424 to a downlink coordinated data transmission to the user equipment 440 in the CoMP cell of cooperating cells of the access nodes 420, 421, 422, 423, 424 is very small. Consequently, it may be advantageous to only allocate the antenna ports of the antennas at the access nodes 420, 423 for downlink coordinated data transmissions to the user equipment 440 in the CoMP cell of cooperating cells of the access nodes 420, 421, 422, 423, 424. The antenna ports of the antennas at the access nodes 421, 422, 424 may instead be allocated to other downlink coordinated data transmissions to another user equipment in the CoMP cell of cooperating cells of the access nodes 420, 421, 422, 423, 424 to which their contribution is more significant. This may be performed by the cooperating cell group unit 302 by arranging the user equipment 440 into a group of user equipments for which, for the same reasons as for the user equipment 440, it may be advantageous to only allocate the antenna ports of the antennas at the access nodes 420, 423 for downlink coordinated data transmissions. The cooperating cell group unit 302 then associates this group of user equipments with this sub-set of antenna ports of the antennas of the access nodes in the CoMP cell of cooperating cells of the access nodes 420, 421, 422, 421, 424, that is, the sub-set of antenna ports of the antennas at the access nodes 420, 423. This process may be performed by the cooperating cell group unit 302 repetitively with a periodicity based on capturing slow fading. According to one example, a suitable periodicity may be about once every second in a current LTE wireless communication system. According to another example, a suitable periodicity may be once every time a signal strength measurement is obtained, such as, for example, when a user equipment 440 sends a report. In an LTE wireless communication system, for example, a user equipment 440 may be configured to report new signal strength measurements based on predetermined threshold values or suitable periodic timers.

Comparing the calculated antenna relationship values for a number of user equipments in the CoMP cell of cooperating cells of the access nodes 420, 421, 422, 423, 424, arranging the number of user equipments into one or more groups of user equipments, and associating this group of user equipments with a sub-set of antenna ports of the antennas of the access nodes in the CoMP cell of cooperating cells of the access nodes 420, 421, 422, 423, 424 may be performed in a number of different ways by the cooperating cell group unit 302. One alternative is to determine the one or more groups of user equipments based on a comparison of the N number of strongest antenna relationships that each user equipment has according to each user equipment's calculated antenna relationship values $S_i$. For example, the top-3 strongest antenna relationships for all user equipments are compared and serve as the basis for determining the one or more groups of user equipments and the subsequent sub-set of antenna ports of the antennas of the access nodes in the CoMP cell of cooperating cells of the access nodes 420, 421, 422, 423, 424. Another alternative is to determine a group of user equipments based on a comparison of the calculated antenna relationships values $S_i$ which falls within a predetermined threshold value from the strongest calculated antenna relationship value. For example, the calculated antenna relationship values $S_i$ of a user equipment falling within 2 dB (63%) of the strongest calculated antenna relationship value $S_i$ may be used to form a group of user equipments and the subsequent sub-set of antenna ports of the antennas of the access nodes in the CoMP cell of cooperating cells of the access nodes 420, 421, 422, 423, 424.

FIG. 5 schematically illustrates an example of resulting groups of user equipments to which downlink coordinated data transmissions may be coordinated by the cooperating cell group unit 302 in the apparatus 300 described in reference to FIGS. 3-4. In one exemplary scenario:

one or more antenna ports of one or more antennas of all of the access nodes 101, 102, 103 participating in the CoMP cell of cooperating cells may be allocated for downlink coordinated data transmissions to a group of user equipments 221, one or more antenna ports of one or more antennas of the access nodes 102, 103 participating in the CoMP cell of cooperating cells may be allocated for downlink coordinated data transmissions to a group of user equipments 231, one or more antenna ports of one or more antennas of the access nodes 101, 103 participating in the CoMP cell of cooperating cells may be allocated for downlink coordinated data transmissions to a group of user equipments 232, one or more antenna ports of one or more antennas of the access nodes 101, 102 participating in the CoMP cell of cooperating cells may be allocated for downlink coordinated data transmissions to a group of user equipments 233, one or more antenna ports of one or more antennas of the access node 101 participating in the CoMP cell of cooperating cells may be allocated for downlink coordinated data transmissions to a group of user equipments 211, one or more antenna ports of one or more antennas of the access node 102 participating in the CoMP cell of cooperating cells may be allocated for downlink coordinated data transmissions to a group of user equipments 212, and one or more antenna ports of one or more antennas of the access node 103 participating in the CoMP cell of cooperating cells may be allocated for downlink coordinated data transmissions to a group of user equipments 213.

In view of the groups of user equipments formed by the cooperating cell group unit 302 in the apparatus 300, such as the exemplary groups of user equipments described above, the cooperating cell group unit 302 may further be configured to combine one of the groups of user equipments, e.g. group 232, with another group of user equipments, e.g. group 221, to form a combined third group of user equipments, i.e. a group of user equipments comprising the user equipments in group 232 and group 221. This combination of groups of user equipments may, for example, be based on jointly associated antenna ports in the sub-sets of the one or more antenna ports of one or more antennas of the access nodes associated with the group of user equipments 232 and the group of user equipments 221, respectively. Thus, the cooperating cell group unit 302 is able to automatically expand a group of user equipments into a larger group of user equipments whenever possible and/or preferred.

The cooperating cell group unit 302 may be configured to perform the combination of groups of user equipments, for example, in the order of the highest number of jointly associated antenna ports or in the order of the smallest group of user equipments (i.e. the group of user equipments comprising the lowest number of user equipments). The combination of groups of user equipments may also be performed by the cooperating cell group unit 302, for example, when the two groups of user equipments (e.g. group 221 and group 232) are associated with a large number of the same antenna ports exceeding a predetermined threshold number of jointly associated a ports, or based on the size of the groups of user equipments (e.g. when the size of a group of user equipments is below a predetermined threshold number of user equipments).

Also, the cooperating cell group unit 302 may be configured to stop the combination of groups of user equipments for combined groups of user equipments. This may, for example, be performed when a predetermined threshold number of antenna ports are comprised in the sub-set of the one or more antenna ports of the one or more antennas of the access nodes associated with the combined group of user equipments. It may also be performed, for example, when a predetermined threshold number of user equipments have been associated with the group of user equipments, when a CoMP transmission multi-user limit has been reached for the group of user equipments, when a transmission power limit has been reached and/or when a channel limitation is reached for the group of user equipments. This may be performed in order to prevent a combined group of user equipments from becoming too large. Too large combined groups of user equipments may result in reduced gains of the group of user equipments and/or in approaching some inherent hardware or signaling limitation of the antennas or access nodes. For example, in order to limit the user equipment report signalling, the combination of groups of user equipments may be stopped when the uplink radio resources reach a certain load threshold. According to another example, to limit the CoMP transmission load, the combination of groups of user equipments may be stopped when the backhaul load reach a certain predetermined threshold.

The cooperating cell group unit 302 may be configured to divide a group of user equipments, e.g. the combined group of user equipments 232 and 221, into two separate groups of user equipments, e.g. group 232 and group 221 as shown in FIG. 5. This division of groups of user equipments may in a similar manner as for the combination of groups of user equipments, for example, be based on jointly associated antenna ports in the sub-sets of the one or more antenna ports of one or more antennas of the access nodes associated with the group of user equipments 232 and the group of user equipments 221, respectively. Any one, or combination, of the criterias listen above that may be used when combining groups of user equipments may in a corresponding manner also be used for dividing groups of user equipments.

Figure 6:
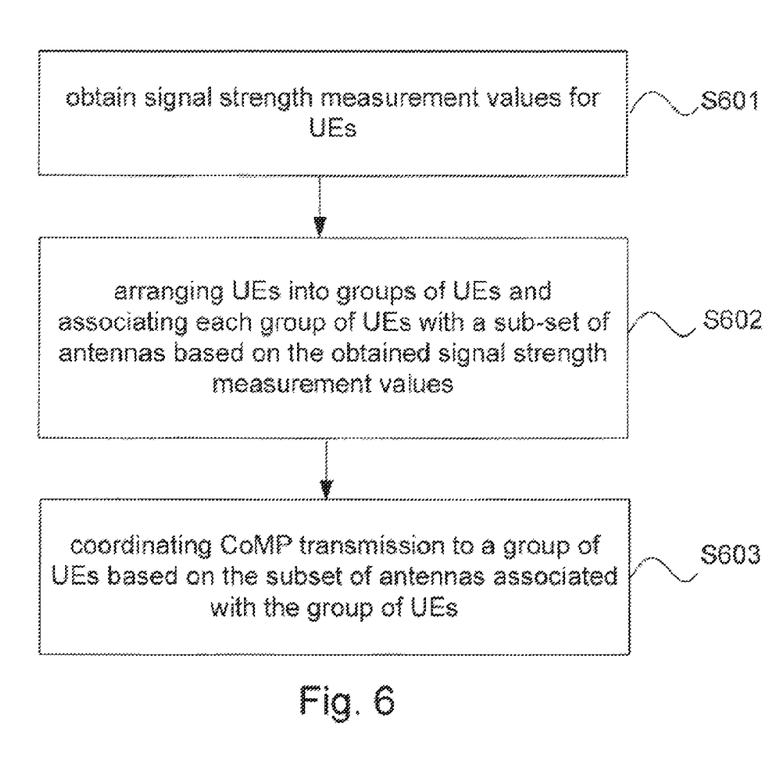
FIG. 6 is a flow chart of a method according to an embodiment of the invention.

FIG. 6 is a flow chart of a method according to an embodiment of the invention. In step S601, the signal strength values may be obtained. The signal strength values may each be associated with the one or more antennas of the access nodes 101, 102, 103 for a number of user equipments. In step S602, the number of user equipments may be arranged into one more groups of user equipments 211, 212, 213, 221, 231, 232, 233 based on the obtained signal strength values in step S601. Further, based on the obtained signal strength values in step S601, each group of user equipments 211, 212, 213, 221, 231, 232, 233 may then also be associated with a sub-set of the one more antennas of the access nodes 101, 102, 103. In step S603, coordinated data transmissions performed by the access nodes 101, 102, 103 may then be coordinated to each of the one or more groups of user equipments 211, 212, 213, 221, 231, 232, 233 based on the sub-set of the one or more antennas of the access nodes 101, 102, 103 associated with each group of user equipments 211, 212, 213, 221, 231, 232, 233, respectively, in step 502.

Figure 7:
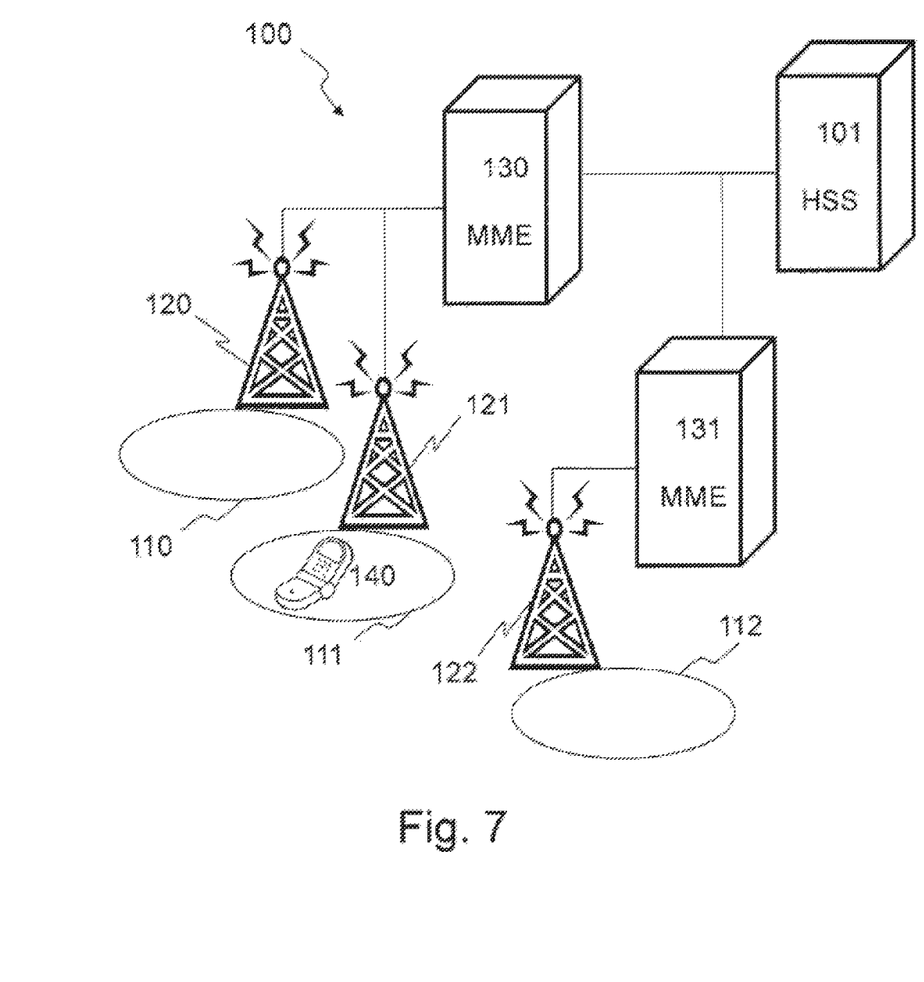
FIG. 7 illustrates a 3GPP Long Term Evolution (LTE/SAE) wireless communication system having a network node comprising an apparatus shown in FIG. 3.

FIG. 7 shows a schematic overview of a 3GPP Long Term Evolution (LTE/SAE) wireless communication network 100. The wireless communication network 100 may comprise a Home Subscriber Server (HSS) 101, a Mobility Management Entity (MME) 130, 131, an access node 120, 121, 122 and a user equipment (UE) 140. The access node 120, 121, 122, such as a radio base station network node or eNode B, is served by the MME 130, 131. Each access node 120, 121, 122 is associated with at least one cell 110, 111, 112. The HSS 101 and the MME 130, 131 may further be referred to as core network nodes 101, 130, 131. Hence, the expression "core network node" is to be understood as primarily meaning any one of the HSS 101 and the MME 130, 131. However, the expression "core network node" may also extend to cover other central network entity nodes, such as, Operation and Management nodes (O&M). Operation and Support System nodes (OSS), or shared database nodes (may be used for synchronisation of common data in MME pools).

It should also be noted that the apparatus 300 and the method illustrated in FIG. 6 as described in reference to the embodiments above may also, besides being able to be comprised in an access node, be able to be comprised in any one of the core network nodes referred to above. Thus, referring to a network node herein and throughout the following claims should be understood as meaning either one of the access nodes or core network nodes.

It should also be noted that in addition to the exemplary embodiments shown in the accompanying drawings, the invention may be embodied in different forms and therefore should not be construed as limited to the embodiments set forth herein. Rather, these embodiments are provided so that this disclosure will be thorough and complete, and will fully convey the concept of the invention to those skilled in the art.

What is claimed is:

1. A method for use in a network node for coordinating data transmissions to user equipments in a wireless communication network, said wireless communication network comprising at least two access nodes each having one or more antennas and being arranged to perform coordinated data transmissions to user equipments, comprising:
   obtaining signal strength values associated with the one or more antennas of the at least two access nodes for a number of user equipments;
   arranging the number of user equipments into one or more groups of user equipments and associating each of the one or more groups of user equipments with a sub-set of the one or more antennas of the at least two access nodes, based on the obtained signal strength values; and
   coordinating data transmissions performed by the at least two access nodes to each of the one or more groups of user equipments based on the sub-set of the one or more antennas of the at least two access nodes associated with each group of user equipments, respectively;
   wherein arranging the number of user equipments and associating the one or more groups of user equipments, further comprises:
      calculating antenna relationship values for each of the number of user equipments based on the obtained signal strength values, and
      arranging the number of user equipments into one or more groups of user equipments and associating each of the one or more groups of user equipments with a sub-set of the one or more antennas of the at least two access nodes based on the calculated antenna relationship values; and
   wherein arranging the number of user equipments and associating the one or more groups of user equipments based on the calculated antenna signal relationship values, further comprises:
      comparing one or more of the calculated antenna relationship values of each of the number of user equipments, and
      arranging the number of user equipments into one or more groups of user equipments and associating each of the one or more groups of user equipments with a sub-set of the one or more antennas of the at least two access nodes based on the antenna relationship value comparison.

2. A method for use in a network node for coordinating data transmissions to user equipments in a wireless communication network, said wireless communication network comprising at least two access nodes each having one or more antennas and being arranged to perform coordinated data transmissions to user equipments, comprising:
   obtaining signal strength values associated with the one or more antennas of the at least two access nodes for a number of user equipments;
   arranging the number of user equipments into one or more groups of user equipments and associating each of the one or more groups of user equipments with a sub-set of the one or more antennas of the at least two access nodes, based on the obtained signal strength values;
   coordinating data transmissions performed by the at least two access nodes to each of the one or more groups of user equipments based on the sub-set of the one or more antennas of the at least two access nodes associated with each group of user equipments, respectively; and
   wherein the method further comprises:
      combining a first group of user equipments with a second group of user equipments to form a combined third group of user equipments based on jointly associated antennas in the sub-sets of the one or more antennas of the at least two access nodes associated with the first and second group of user equipments, respectively; and
   dividing a first group of user equipments into a second and third group of user equipments based on jointly associated antennas in the sub-sets of the one or more antennas of the at least two access nodes associated with the second and third group of user equipments, respectively.

3. The method according to claim 2, wherein the combination of groups of user equipments is stopped or the division of a group of user equipments is initiated based on one or more of:
   when one or more predetermined threshold number of antennas is comprised in the sub-set of the one or more antennas of the at least two access nodes associated with the group of user equipments,
   when one or more predetermined threshold number of user equipments have been associated with the group of user equipments,
   when one or more predetermined CoMP transmission multi-user limits has been reached for the group of user equipments,
   when one or more predetermined channel limitations is reached for the group of user equipments,
   when one or more predetermined transmission power limits are reached,
   when one or more predetermined backhaul load thresholds are reached,
   when one or more predetermined uplink radio channel load thresholds are reached.

4. An apparatus for use in a network node for coordinating data transmissions to user equipments in a wireless communication network, said wireless communication network comprising at least two access nodes each access node having one or more antennas and being arranged to perform coordinated data transmissions to user equipments, said apparatus comprising:
   a retrieving unit configured to obtain signal strength values associated with the one or more antennas of the at least two access nodes for a number of user equipments;
   a cooperating cell group unit configured to arrange the number of user equipments into one or more groups of user equipments and associate each of the one or more groups of user equipments with a sub-set of the one or more antennas of the at least two access nodes, based on the signal strength values obtained by the retrieving unit; and a cooperation scheduling unit configured to coordinate data transmissions performed by the at least two access nodes to each of the one or more groups of user equipments based on the sub-set of the one or more antennas of the at least two access nodes associated with each group of user equipments, respectively;

wherein the cooperating cell group unit is further configured to calculate antenna relationship values for each of the number of user equipments based on the obtained signal strength values, and arrange the number of user equipments into one or more groups of user equipments and associate each of the one or more groups of user equipments with a sub-set of the one or more antennas of the at least two access nodes based on the calculated antenna relationship values; and wherein the cooperating cell group unit is further configured to compare one or more of the calculated antenna relationship values of each of the number of user equipments, and arrange the number of user equipments into one or more groups of user equipments and associate each of the one or more groups of user equipments with a sub-set of the one or more antennas of the at least two access nodes based on the antenna relationship value comparison.

5. An apparatus for use in a network node for coordinating data transmissions to user equipments in a wireless communication network, said wireless communication network comprising at least two access nodes each access node having one or more antennas and being arranged to perform coordinated data transmissions to user equipments, said apparatus comprising:

a retrieving unit configured to obtain signal strength values associated with the one or more antennas of the at least two access nodes for a number of user equipments;

a cooperating cell group unit configured to arrange the number of user equipments into one or more groups of user equipments and associate each of the one or more groups of user equipments with a sub-set of the one or more antennas of the at least two access nodes, based on the signal strength values obtained by the retrieving unit; and a cooperation scheduling unit configured to coordinate data transmissions performed by the at least two access nodes to each of the one or more groups of user equipments based on the sub-set of the one or more antennas of the at least two access nodes associated with each group of user equipments, respectively;

wherein the cooperating cell group unit is further configured to combine a first group of user equipments with a second group of user equipments to form a combined third group of user equipments based on jointly associated antennas in the sub-sets of the one or more antennas of the at least two access nodes associated with the first and second group of user equipments, respectively; and wherein the cooperating cell group unit is further configured to divide a first group of user equipments into a second and third group of user equipments based on jointly associated antennas in the sub-sets of the one or more antennas of the at least two access nodes associated with the second and third group of user equipments, respectively.

6. The apparatus according to claim 5, wherein the cooperating cell group unit is further configured to stop the combination of groups of user equipments or initiate the division of a group of user equipments based on one or more of:

when one or more predetermined threshold number of antennas is comprised in the sub-set of the one or more antennas of the at least two access nodes associated with the group of user equipments, when one or more predetermined threshold number of user equipments have been associated with the group of user equipments, when one or more predetermined CoMP transmission multi-user limits has been reached for the group of user equipments, when one or more predetermined channel limitations is reached for the group of user equipments, when one or more predetermined transmission power limits are reached, when one or more predetermined backhaul load thresholds are reached, when one or more predetermined uplink radio channel load thresholds are reached.

* * * * *

UNITED STATES PATENT AND TRADEMARK OFFICE
CERTIFICATE OF CORRECTION

PATENT NO. : 9,831,926 B2
APPLICATION NO. : 15/043014
DATED : November 28, 2017
INVENTOR(S) : Burström et al.

It is certified that error appears in the above-identified patent and that said Letters Patent is hereby corrected as shown below:

On the Title Page

On Page 2, in Item (57), under "ABSTRACT", in Column 1, Line 7, delete "two one" and insert -- two --, therefor.

In the Specification

In Column 1, Line 10, delete "2013," and insert -- 2013, now Pat. No. 9,281,876, --, therefor.

In Column 2, Line 15, delete "at" and insert -- that --, therefor.

In Column 3, Line 44, delete "of equipments," and insert -- of user equipments, --, therefor.

In Column 4, Line 7, delete "one or" and insert -- one or more --, therefor.

In Column 4, Line 31, delete "costs form" and insert -- costs in form --, therefor.

In Column 5, Line 21, delete "illustrates" and insert -- illustrate --, therefor.

In Column 5, Lines 42-51, delete "The figures..............................and the like.".

In Column 7, Line 33, delete "Reference Symbols" and insert -- Reference Signals --, therefor.

In Column 9, Line 1, delete "illustrates" and insert -- illustrate --, therefor.

In Column 10, Line 10, delete "422, 421," and insert -- 422, 423, --, therefor.

In Column 11, Line 51, delete "a ports," and insert -- antenna ports, --, therefor.

Signed and Sealed this
Twenty-seventh Day of November, 2018

Andrei Iancu
*Director of the United States Patent and Trademark Office*

In Column 12, Line 35, delete "one more" and insert -- one or more --, therefor.

In Column 12, Line 40, delete "one more" and insert -- one or more --, therefor.

In Column 12, Line 64, delete "Operation and Management nodes (O&M)." and insert -- Operation and Maintenance (O&M), --, therefor.

In Column 12, Lines 64-65, delete "Operation and Support System nodes (OSS)," and insert -- Operations Support System nodes (OSS), --, therefor.